US 8,656,001 B2

(12) United States Patent
Takeda et al.

(10) Patent No.: US 8,656,001 B2
(45) Date of Patent: Feb. 18, 2014

(54) COMMUNICATION SYSTEM, APPLICATION SERVER AND COMMUNICATION METHOD FOR SERVER COOPERATION

(75) Inventors: Yukiko Takeda, Higashimurayama (JP); Akihiko Takase, Tokyo (JP); Daisuke Matsubara, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 257 days.

(21) Appl. No.: 12/866,396

(22) PCT Filed: Dec. 19, 2008

(86) PCT No.: PCT/JP2008/073179
§ 371 (c)(1),
(2), (4) Date: Aug. 5, 2010

(87) PCT Pub. No.: WO2009/110158
PCT Pub. Date: Sep. 11, 2009

(65) Prior Publication Data
US 2011/0029654 A1   Feb. 3, 2011

(30) Foreign Application Priority Data

Mar. 6, 2008 (JP) .................................. 2008-055700

(51) Int. Cl.
G06F 15/16 (2006.01)
G06F 15/173 (2006.01)

(52) U.S. Cl.
USPC ........... 709/223; 709/228; 709/227; 709/217; 370/352

(58) Field of Classification Search
USPC .................. 709/223, 227–228, 217; 370/352
See application file for complete search history.

(56) References Cited

U.S. PATENT DOCUMENTS

| 7,248,575 | B2 * | 7/2007 | Leslie et al. ................ 370/352 |
| 7,369,540 | B1 * | 5/2008 | Giroti ......................... 370/352 |
| 7,725,548 | B2 * | 5/2010 | Ohtani et al. ................ 709/206 |
| 7,917,124 | B2 * | 3/2011 | D'Angelo et al. ............ 455/411 |
| 8,081,586 | B2 * | 12/2011 | Kiss ............................. 370/282 |
| 2003/0063623 | A1 * | 4/2003 | Leslie et al. ................ 370/466 |
| 2003/0079020 | A1 * | 4/2003 | Gourraud et al. ............ 709/227 |
| 2005/0044188 | A1 | 2/2005 | Nakazawa et al. |
| 2006/0046757 | A1 * | 3/2006 | Hoover et al. ................ 455/518 |
| 2006/0046758 | A1 * | 3/2006 | Emami-Nouri et al. ...... 455/518 |
| 2006/0050683 | A1 * | 3/2006 | Wall et al. .................... 370/352 |
| 2006/0069783 | A1 | 3/2006 | Aihara et al. |

(Continued)

FOREIGN PATENT DOCUMENTS

CN    1585335 A    2/2005
EP    1 701 570 A1    9/2008

(Continued)

OTHER PUBLICATIONS

Parlay X Web Services Specificaiton, Version 1.0.1, Jun. 22, 2004.*

(Continued)

Primary Examiner — Alina N Boutah
(74) Attorney, Agent, or Firm — Crowell & Moring LLP

(57) ABSTRACT

A communication entrepreneur has an application server 2 having message conversion function. The application server 2 performs service function distribution processing with reference to trigger rule 220 and message rule 230. The communication entrepreneur can provide various service functions without notifying individual server addresses to a service entrepreneur.

11 Claims, 16 Drawing Sheets

(56) References Cited

U.S. PATENT DOCUMENTS

| | | | |
|---|---|---|---|
| 2006/0099934 A1* | 5/2006 | Song et al. | 455/412.2 |
| 2007/0011322 A1* | 1/2007 | Moiso | 709/225 |
| 2007/0077922 A1* | 4/2007 | Kim et al. | 455/414.2 |
| 2007/0133761 A1* | 6/2007 | Rhee et al. | 379/88.13 |
| 2008/0080478 A1* | 4/2008 | Storrie et al. | 370/352 |
| 2008/0133729 A1* | 6/2008 | Fridman et al. | 709/223 |
| 2008/0139221 A1* | 6/2008 | Yoo et al. | 455/456.2 |
| 2008/0146201 A1* | 6/2008 | O'Neill et al. | 455/414.1 |
| 2009/0129575 A1* | 5/2009 | Chakraborty et al. | 379/201.03 |
| 2009/0182565 A1* | 7/2009 | Erickson et al. | 705/1 |
| 2009/0187919 A1* | 7/2009 | Maes | 719/313 |
| 2009/0201917 A1* | 8/2009 | Maes et al. | 370/352 |
| 2009/0287740 A1* | 11/2009 | Banerjee et al. | 707/104.1 |
| 2009/0300189 A1* | 12/2009 | Takeda et al. | 709/227 |
| 2010/0332614 A1* | 12/2010 | Holm et al. | 709/217 |
| 2011/0167160 A1* | 7/2011 | Murakami et al. | 709/227 |
| 2012/0173745 A1* | 7/2012 | Maes | 709/228 |

FOREIGN PATENT DOCUMENTS

| | | |
|---|---|---|
| JP | 2004-247916 A | 9/2004 |
| JP | 2005-63371 A | 3/2005 |
| JP | 2006-127470 A | 5/2006 |
| JP | 2006-285619 A | 10/2006 |

OTHER PUBLICATIONS

Parlay 4.0, Parlay X Web Services Specification, Version 1.0.1, Jun. 22, 2004.*

Supplementary European Search Report dated Jun. 8, 2012 (seven (7) pages).

"NTT COM developed SDP for ASP" p. 28, Nikkei Communications Oct. 15, 2007.

Japanese-language Office Action dated Oct. 2, 2012 (three (3) pages).

International Search Report dated Mar. 31, 2009 (Two (2) pages).

Hisatoshi Adachi, "Iyoiyo Kochiku ga Hajimatta NGN no Subete", Nikkei Communications, May 15, 2007, pp. 72-77, No. 486.

Susumu Nakai, "NTT Com ga ASP Muke no SDP O Kaihatsu", Nikkei Communications, Oct. 15, 2007, pp. 28, No. 496.

Yohei Ichijima, "NGN de Nani ga Kawaruka Kigyo Joho System eno Impact", Nikkei Computer, Nov. 27, 2006, pp. 54-57, No. 666.

J. Rosenburg et al., "SIP: Session Initiation Protocol", IETF RFC3261, pp. 1-201, Jun. 2002.

J. Rosenburg et al., "Best Current Practices for Third Party Call Control in the Session Initiation Protocol", IETF RFC3725, pp. 1-31, Apr. 2004.

"Open Service Access (OSA); Parlay X Web Services; Part 2: Third Party Call", ETSI, 4$^{th}$ Draft ES 202 504-2 Parlay X 3.0, pp. 1-20, Aug. 2007.

* cited by examiner

FIG. 5A

| Parlay X callSession Identifier (211) | Web SERVER IP ADDRESS (212) | ENABLER IP ADDRESS (213) | TRIGGER RULE (214) | SESSION STATE (215) | |
|---|---|---|---|---|---|
| 1234 | Web-ip | 3pcc-ip | zzz | | ~210-1 |
| | | | | | ~210-2 |
| | | | | | ~210-n |

FIG. 5B

| namespace (221) | TRIGGER RULE (222) | ENABLER IP ADDRESS (223) | INFORMATION AS TO WHETHER ADDITIONAL INFORMATION PROCESSING IS PRESENT OR NOT (224) | |
|---|---|---|---|---|
| parlayx/terminal_location/v3_0 | xxx | | | ~210-1 |
| parlayx/presence/v3_2 | yyy | | PRESENT | ~210-2 |
| parlayx/third_party_call/v3_3 | zzz | 3pcc-ip | | ~210-n |

FIG. 6A

| PARLAY X MESSAGE ~231 | SIP MESSAGE ~232 | INFORMATION AS TO WHETHER PARAMETER CONVERSION IS PRESENT OR NOT ~233 | |
|---|---|---|---|
| make call session request | INVITE | PRESENT | ~230-1 |
| end call session request | BYE | NOT PRESENT | ~230-2 |
| | | | ~230-n |

FIG. 6B

| PARLAY X PARAMETER ~241 | SIP PARAMETER ~242 | | |
|---|---|---|---|
| callParticipants | Request URI | | ~240-1 |
| | | | ~240-2 |
| | | | ~240-n |

FIG. 16A

| PARLAY X MESSAGE | SIP MESSAGE | INFORMATION AS TO WHETHER PARAMETER CONVERSION IS PRESENT OR NOT | |
|---|---|---|---|
| make call session request | INVITE | PRESENT | ~330-1 |
| end call session request | BYE | NOT PRESENT | ~330-2 |
| | | | ~330-n |

| PARLAY X PARAMETER | SIP PARAMETER | | | |
|---|---|---|---|---|
| callParticipants | Request URI | | | ~340-1 |
| | | | | ~340-2 |
| | | | | ~330-n |

341 / 342

COMMUNICATION SYSTEM, APPLICATION SERVER AND COMMUNICATION METHOD FOR SERVER COOPERATION

CROSS-REFERENCE TO RELATED APPLICATIONS

This application claims priority from Japanese Patent Application No. 2008-055700 filed on Mar. 6, 2008, the content of which is hereby incorporated by reference into this application.

BACKGROUND OF THE INVENTION

1. Field of the Invention

The technique disclosed in this application relates to a communication device connected to a network, a communication system and a communication control method. Particularly, it relates to server cooperation at the time that a plurality of communication servers perform mutual communication and message conversion processing. Especially, it relates to a communication system to which session control using SIP (Session Initiation Protocol) is applied and a message conversion method in communication systems in which communication systems for providing Web application are connected mutually.

2. Description of Related Art

The 3rd-generation mobile communication system is being standardized so as to aim at providing various multimedia services such as voice, data and animation at high speed and with high quality. The 3GPP (3rd-Generation Partnership Project) advances standardization of "All IP Base Mobile Communication Network" that provides multimedia services such as voice and picture utilizing Internet Protocol (IP) technique on a packet switching network.

The session control system of the All IP Base Mobile Communication Network is named IMS (IP Multimedia Subsystem). The IMS is also adopted in session control technique of NGN (Next-Generation Network).

The SIP (Session Initiation Protocol) is utilized as the session control protocol of the IMS (for example, refer to IETF RFC3261 (2002.6)). The SIP is the protocol for controlling session of IP multimedia communication specified by IETF. The SIP controls establishment, maintenance and disconnection of session among communication devices.

As the representative service using SIP, there is IP telephony service. The IP telephony service is the service for transmitting and receiving voice information through IP network. In the IP telephony service using SIP, virtual speech path or channel (session) is established between communication devices before communication is started. Voice data formed into IP packets is transferred through the established communication path.

Media information such as attributes of voice data is decided upon establishment of session. The communication device notifies the media information using SDP (Session Description Protocol) contained in SIP message. In the SDP, various information concerning session (for example, IP address, port number, kind of media and the like) can be described. As an example of application service using the SIP protocol, there is the third party call control (refer to IETF RFC3725 (2004.6), for example).

Moreover, in order to make it possible to utilize the communication service provided by a communication entrepreneur from Web service, investigation of API (Application Programming Interface) is advanced.

There is the Parlay group as an industrial organization stipulating the API. The Parlay group is deciding on a plan for API named "Parlay X". The Parlay group cooperates with ETSI (European telecommunication standards institute) and 3rd-generation mobile telecommunication standardization organization (3GPP). The specifications of the Parlay X are issued from the 3 organizations jointly.

The "Parlay X" is API of Web service that does not depend on network and vendor and is not limited to language provided therein for the purpose of use in Web service environment. The "Parlay X" defines open interface abstracted for Web developers but its mounting or implementing method is not prescribed.

In the "Parlay X", a set of API is stipulated for each service. As service provided using the Parlay X API, there is, for example, 3PCC (3rd Party Call Control) starting 2-party conversation service from Web application (4th Draft ES 202 504-2 Parlay X 3.0 (2007.8)).

Non-patent document 1: IETF RFC3261 (2002.6)
Non-patent document 2: IETF RFC3725 (2004.4)
Non-patent document 3: 4th Draft ES 202 504-2 Parlay X 3.0 (2007.8)

BRIEF SUMMARY OF THE INVENTION

The API for 3PCC stipulates request messages (start, end, call information inquiry) to communication system from Web application server and response messages thereto. As an example of application using SIP protocol, there is third party call control and a sequence example of SIP message is shown. However, mounting method of the Parlay X API and conversion measures of the SIP message is not stipulated.

Accordingly, the communication system in which the service entrepreneur utilizes service function of the communication entrepreneur via open API represented by the Parlay X has a problem that the communication entrepreneur is required to specify the server corresponding to the required service function.

It is an object of the present invention to provide measures for making it possible to utilize various service functions without making the communication entrepreneur notify address of individual application server to the service entrepreneur.

According to a representative invention disclosed in this application, a communication system includes an application server having conversion function of open API and SIP. The application server performs service function distribution processing with reference to trigger rule and message rule. By providing this function, the communication entrepreneur can provide various service functions without notifying address of individual application server to the service entrepreneur.

According to another representative invention disclosed in this application, the application server further includes additional information processing function such as customization processing (for example, additional processing function of parameter) in accordance with a request of the service entrepreneur and high-speed engine (for example, high-speed engine of transaction processing such as accounting information) in accordance with contents of various processing. By providing this function, the application server can realize customization and high-speed operation of specified processing.

According to an embodiment of the present invention, the communication entrepreneur can provide various service functions without notifying address of individual server to the service entrepreneur. Further, the communication entrepreneur can perform customization of processing and high-speed operation of specified processing. Thus, various services can be provided rapidly in accordance with user's need.

Other objects, features and advantages of the present invention will be apparent from the following description of embodiments of the present invention taken in conjunction with the accompanying drawings.

BRIEF DESCRIPTION OF THE DRAWINGS

FIG. 5A is a diagram showing an example of configuration of a session information table of the application server 2 in the first embodiment of the present invention;

FIG. 5B is a diagram showing an example of configuration of a trigger rule of the application server 2 in the first embodiment of the present invention;

FIG. 6A is a diagram showing an example of configuration of a message rule of the application server 2 in the first embodiment of the present invention;

FIG. 6B is a diagram showing an example of configuration of a parameter rule of the application server 2 in the first embodiment of the present invention;

FIG. 16A is a diagram showing an example of configuration of message rule of the 3PCC server 3 in the second embodiment of the present invention; and FIG. 16B is a diagram showing an example of configuration of parallel rule of the 3PCC server 3 in the second embodiment of the present invention.

BEST MODE FOR CARRYING OUT DETAILED DESCRIPTION OF THE INVENTION

A first embodiment of the present invention is now described with reference to the accompanying drawings.

As a representative example, a communication method at the time that the third-party call control (3PCC) service is utilized is described in detail.

Figure 1:
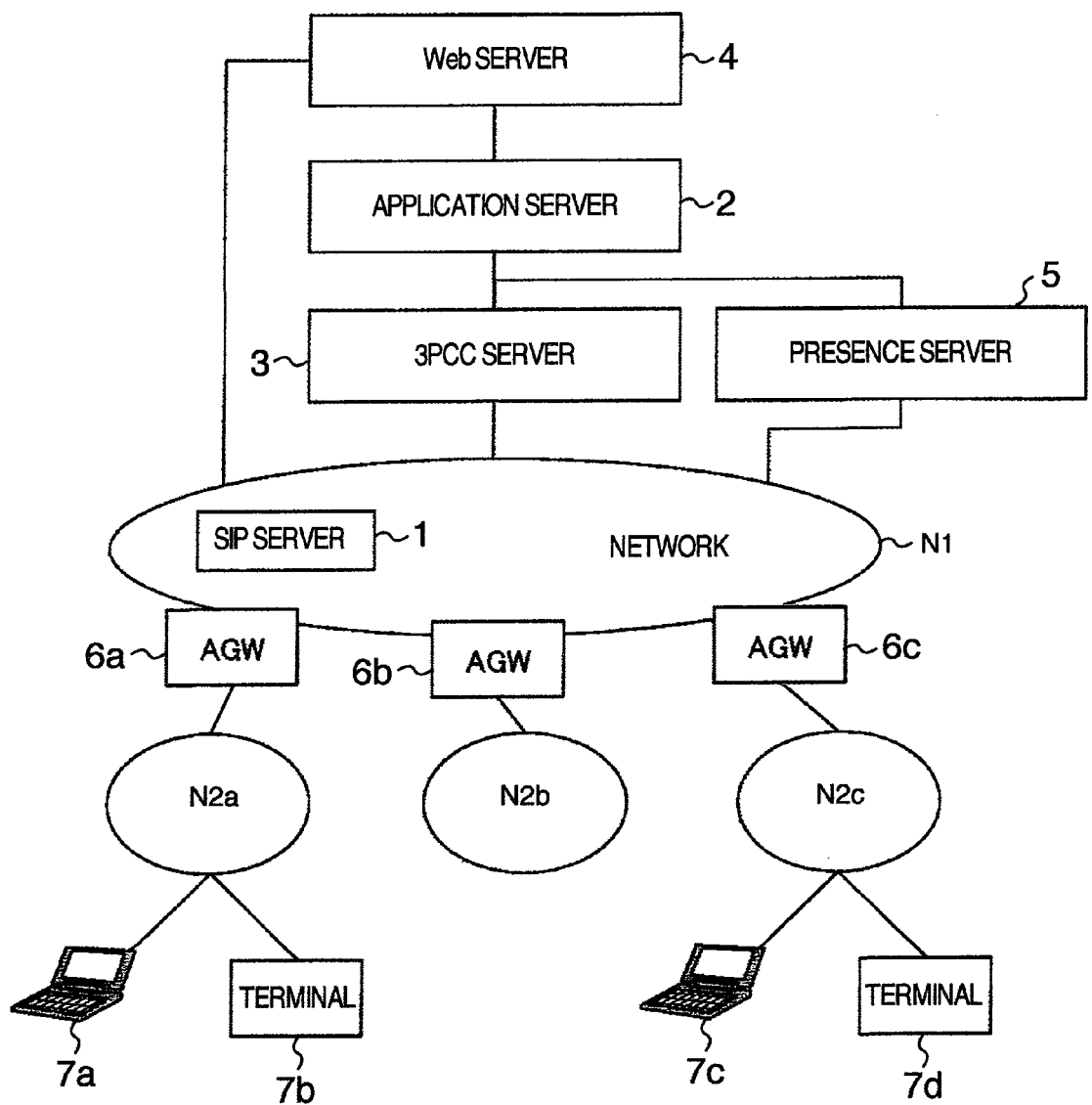
FIG. 1 is a schematic diagram illustrating a configuration example of a communication network according to a first embodiment of the present invention.

FIG. 1 is a schematic diagram illustrating a configuration example of a communication network according to the first embodiment of the present invention.

The communication network of the embodiment includes an IP network N1 and access networks N2 (N2a, N2b and N2c).

In FIG. 1, fixed or wired terminals (7a-7d) are shown as an example of terminals (hereinafter referred to as UE (User Equipment)). When the terminals 7 are distinguished individually in description, the reference numeral thereof is annexed with subscripts "a", "b", "c" and "d" and described as terminal 7a and terminal 7b, for example. Other constituent elements are also described according to the same rule.

The IP network N1 is connected to the access networks N2 through access gateway devices (AGW) 6 (6a, 6b, 6c). The IP network N1 may be connected to the access networks N2 through router or another communication device instead of the access gateway devices 6. The access gateway devices 6 provide function of transferring IP packets transmitted and received between the terminal 7 and the IP network N1.

The IP network N1 includes SIP server 1, Web server 4, application server 2 and 3PCC server 3 at least. The IP network N1 may further include presence server 5. When the IP network N1 includes the presence server 5, the IP network N1 can provide presence service.

The Web server 4 has user interface function for starting 3PCC service and presence service, function necessary for starting 3PCC service and mutual connection function with application server 3.

The application server 2 has service function distribution function necessary for utilizing various service functions provided in the communication network and function for controlling customization function.

The 3PCC server 3 has function for controlling implementation of 3PCC service.

The presence server 5 has function for controlling implementation of presence service.

In FIG. 1, the SIP server 1, the Web server 4, the application server 2, the 3PCC server 3 and the presence server 5 are shown singly. However, when the present invention is implemented, any number of these constituent elements may be provided.

Figure 2:
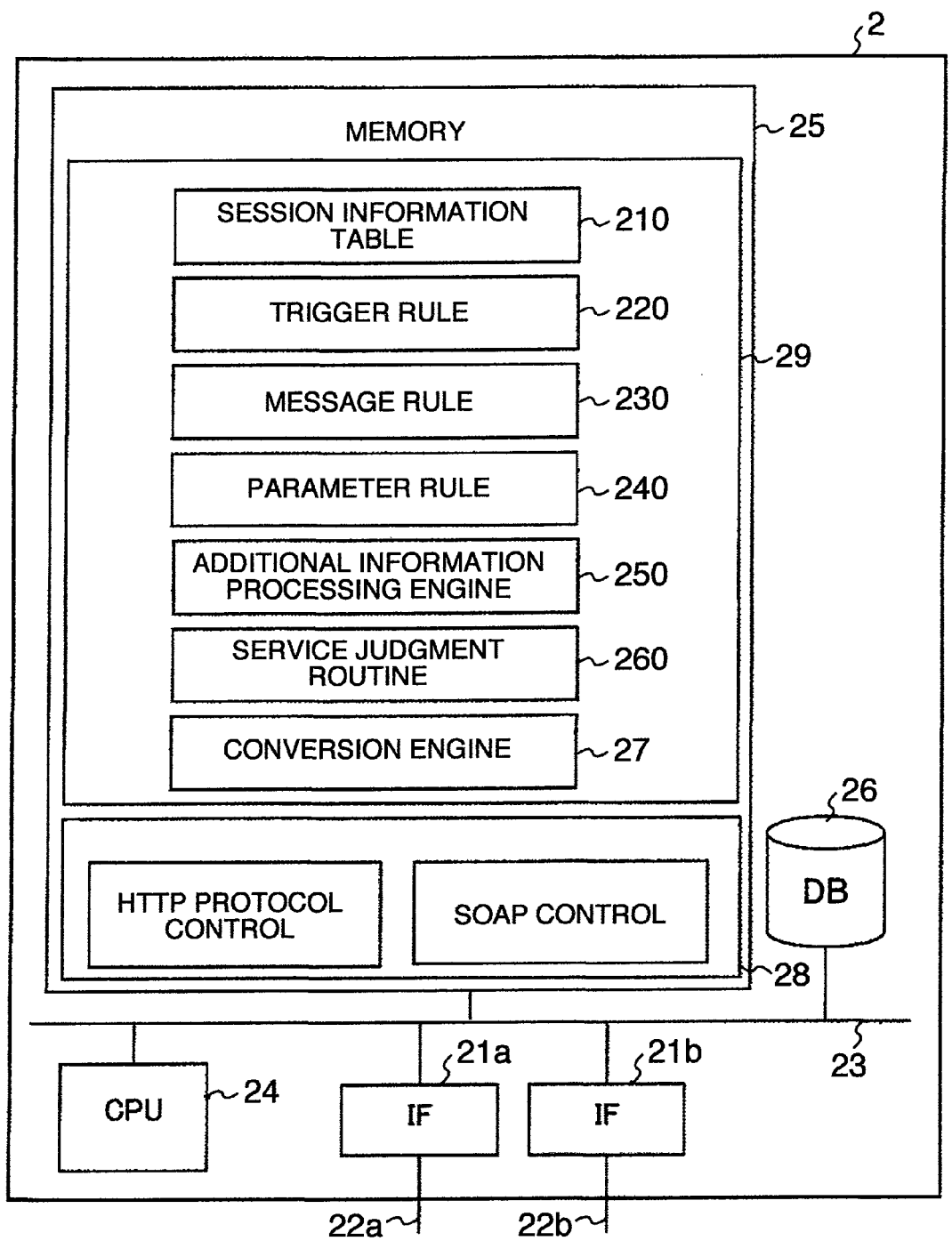
FIG. 2 is a schematic diagram illustrating a configuration example of an application server 2 in the first embodiment of the present invention.

FIG. 2 is a schematic diagram illustrating a configuration example of the application server 2 in the first embodiment of the present invention.

The application server 2 includes interface parts (IF) 21 (21a, 21b) having lines 22 (22a, 22b) connected thereto, a CPU 24, a memory 25 and a database (DB) 26. These constituent elements are connected through a bus 23.

The memory 25 stores therein a program 28 for executing protocol processing and a program 29 for receiving message from Web server 4 and performing mutual connection function between the 3PCC server 3 and the application server 2 and between the presence server 5 and the application server 2. The memory 25 may store therein still another program.

The CPU 24 is a processor for executing programs stored in the memory 25. In the following description, the processing executed by the application server 2 is actually executed by execution of any program by the CPU 24.

The program 28 for executing protocol processing contains program having function of transmitting or receiving signal between the Web server 4 and the application server 2 and program having function of transmitting or receiving signal between the 3PCC server 3 and the application server 2 and between the presence server 5 and the application server 2. For example, when the Web server 4 and the application server 2 make communication by SOAP over HTTP, the communication is made using SOAP control part and HTTP protocol control part. Furthermore, when the application server 2 and the 3PCC server 3 make communication by HTTP, the communication is made using HTTP protocol control part.

In FIG. 2, HTTP and SOAP are shown as communication protocol. However, when the present invention is implemented, protocol except HTTP and SOAP may be utilized.

The program 29 for performing mutual connection function includes session information table 210, trigger rule 220, message rule 230, parameter rule 240, additional information processing engine 250, service judgment routine 260 and conversion engine 27. The database 26 may store therein session information table 210, trigger rule 220, message rule 230 and parameter rule 240.

Provision of trigger rule 220, message rule 230, parameter rule 240 and service judgment routine 260 in the application server 2 can make the application server 2 control service function in accordance with request received from the Web server 4. The service function is realized by the presence server 5 and the 3PCC server 3. The service function is sometimes named enabler.

Moreover, provision of additional information processing engine 250 in the application server 2 can control customization function and function requiring high-speed operation.

Figure 7:
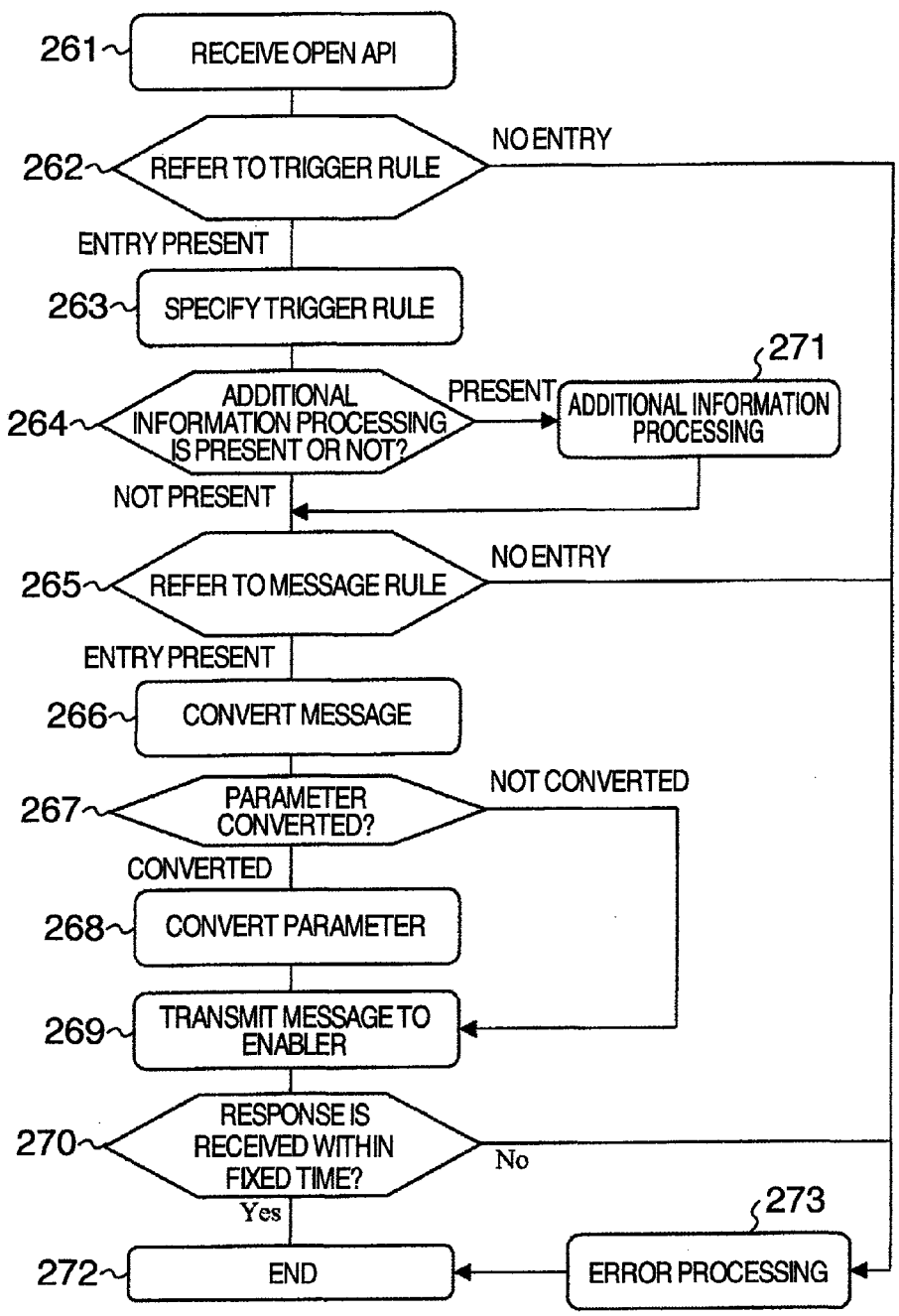
FIG. 7 is a flow chart showing a service judgment routine of the application server 2 in the first embodiment of the present invention.

FIG. 7 is a diagram showing the service judgment routine 260 in the first embodiment of the present invention.

FIG. 5A is a diagram showing an example of configuration of the session information table 210 in the first embodiment of the present invention. When the application server 2 receives a request from the Web server 4, the application server 2 refers to the session information table 210 and updates it.

The session information table 210 stores therein at least Web server address 212, enabler address 213 and trigger rule 214 in a corresponding manner to Parlay X call session identifier 211. Moreover, the session information table 210 may store therein session state 215. By providing the trigger rule 214 in the session information table 210, the application server 2 can detect the service function to be started rapidly. By providing the session state 215 in the session information table 210, the application server can hold the session state.

FIG. 5B is a diagram showing an example of configuration of the trigger rule 220 in the first embodiment of the present invention.

The trigger rule 220 stores therein at least trigger rule 222 and enabler IP address 223 in a corresponding manner to namespace 221 of Parlay X API. When the application server 2 receives a request from the Web server 4, the application server 2 extracts the namespace from the received message and specifies the trigger rule 222 corresponding to the namespace. Furthermore, the application server 2 extracts the enable IP address 223 corresponding to the entry and specifies address information of the server having the service function corresponding to the request message.

The trigger rule 220 may store therein information 224 as to whether additional information processing is present or not.

By providing the information 224 as to whether additional information processing is present or not in the trigger rule 220, the application server 2 can specify customization processing and high-speed processing for each trigger rule.

FIG. 6A is a diagram showing an example of configuration of the message rule 230 in the first embodiment of the present invention. The application server 2 refers to the message rule according to the trigger rule after the trigger rule is specified and converts Parlay X message 231 and SIP message 232.

The message rule 230 stores therein at least the SIP message 232 corresponding to the Parlay X message 231. The message rule 230 may store therein flag 233 indicating whether parameter conversion processing is present or not.

By including the flag 233 indicating whether parameter conversion processing is present or not in the message rule 230, the application server 2 can judge whether parameter contained in message is converted or not.

FIG. 6B is a diagram showing an example of configuration of the parameter rule 240 in the first embodiment of the present invention. The parameter rule 240 stores therein at least SIP parameter 242 corresponding to Parlay X parameter 241. By providing this table in the application server 2, the application server 2 can convert Parlay X parameter and SIP parameter.

When the application server 2 judges that parameter conversion is required as a result of reference to the message rule 230, the application server 2 refers to the parameter rule 240 using Parlay X parameter contained in message as a search key. When relevant entry exists in the parameter rule 240, the application server 2 performs conversion of Parlay X parameter and SIP parameter (SIP header).

Figure 3:
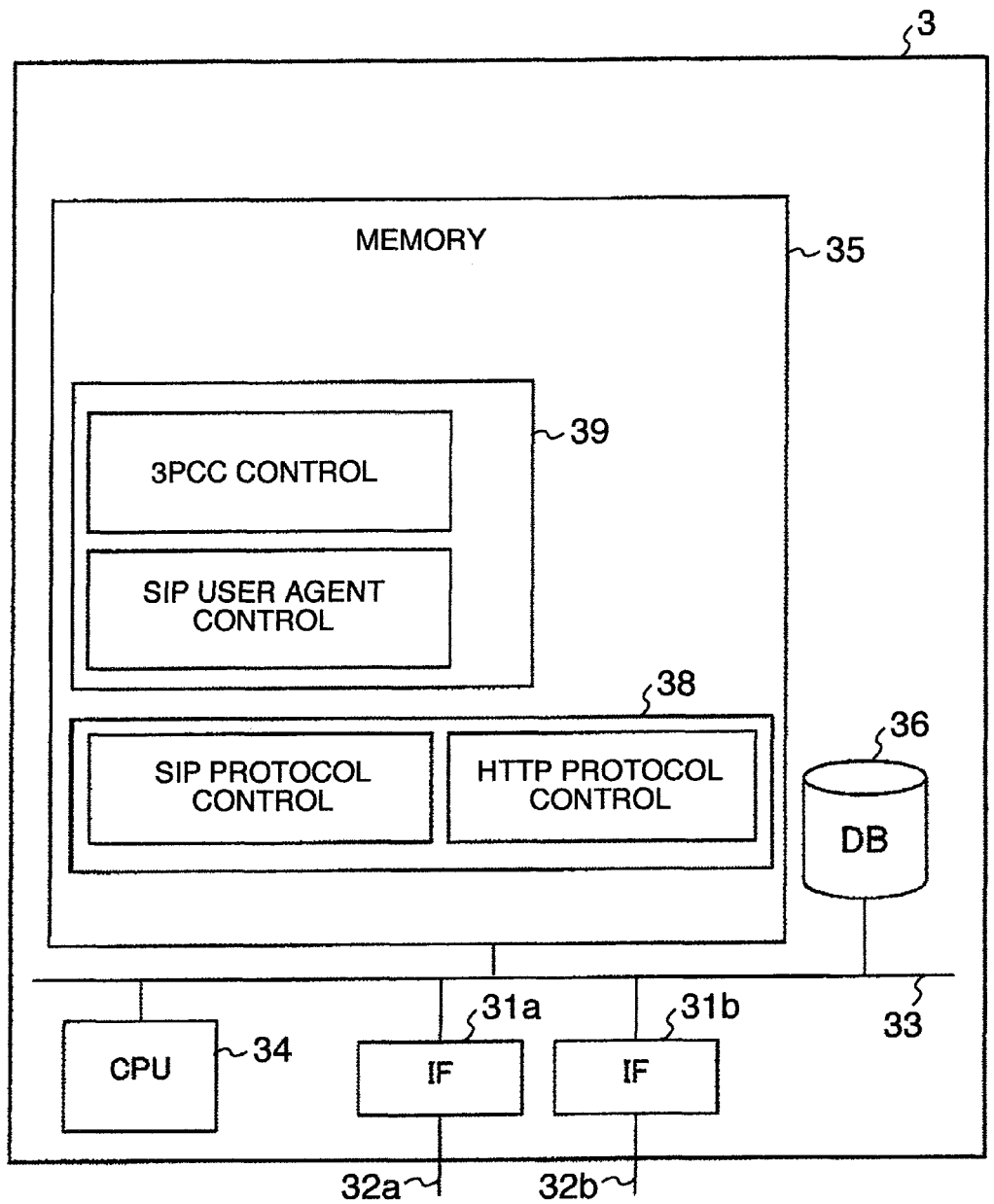
FIG. 3 is a schematic diagram illustrating a configuration example of a 3PCC server 3 in the first embodiment of the present invention.

FIG. 3 is a schematic diagram illustrating a configuration example of the 3PCC server 3 in the first embodiment of the present invention.

The 3PCC server 3 includes interface parts (IF) 31 (31a, 31b) having lines 32 (32a, 32b) connected thereto, a CPU 34, a memory 35 and a database (DB) 36. These constituent elements are connected through a bus 33.

The memory 35 stores therein program 38 (SIP protocol control and HTTP protocol control) for executing protocol processing and program 39 (program for performing SIP User Agent processing and program for performing 3PCC control processing) for executing 3PCC server processing. The memory 35 may store therein still another program.

The CPU 34 is a processor for executing programs stored in the memory 35. In the following description, the processing executed by the 3PCC server 3 is actually executed by execution of any program by the CPU 34.

The program 38 for executing protocol processing contains program (SIP protocol control) having function for transmitting or receiving signal between the SIP server 1 and the 3PCC server 3 and program (HTTP protocol control) having function for transmitting or receiving signal between the application server 2 and the 3PCC server 3. In FIG. 3, HTTP and SIP are shown as communication protocol. However, when the present invention is implemented, communication protocol except HTTP may be utilized so that the 3PCC server 3 and the application server 2 communicate with each other.

The program 39 for executing 3PCC server processing contains program for performing SIP User Agent processing and program for performing 3PCC control processing. Correspondence information of session identifier on the side of Parlay X and identifier of 3PCC session may be provided in addition to the program for performing 3PCC control processing. Moreover, the memory 35 of the 3PCC server 3 may store therein information necessary for 3PCC server processing. The information necessary for 3PCC server processing may be stored in DB 36.

Figure 4:
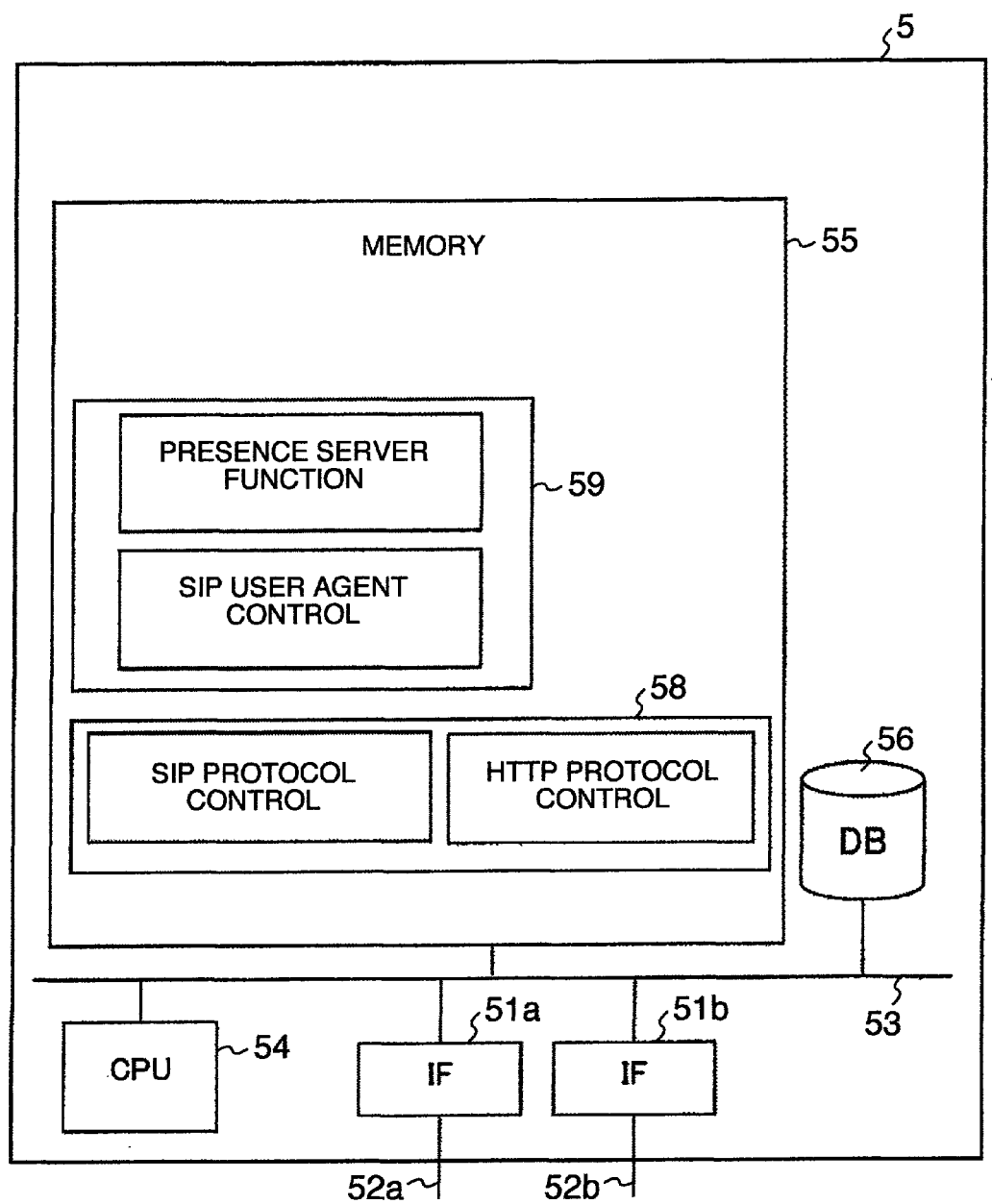
FIG. 4 is a schematic diagram illustrating a configuration example of a presence server 5 in the first embodiment of the present invention.

FIG. 4 is a schematic diagram illustrating a configuration example of the presence server 5 in the first embodiment of the present invention.

The presence server 5 includes interface parts (IF) 51 (51a, 51b) having lines 52 (52a, 52b) connected thereto, a CPU 54, a memory 55 and a database (DB) 56. These constituent elements are connected through a bus 53.

The memory 55 stores therein program 58 (SIP protocol control and HTTP protocol control) for executing protocol processing and program 59 (program for performing SIP User Agent processing and program for performing presence control processing) for executing presence server processing. The memory 55 may store therein still another program. Furthermore, the memory 55 may store therein information necessary for presence control processing. The information necessary for presence control processing may be stored in DB 56.

The CPU 54 is a processor for executing programs stored in the memory 55. In the following description, the processing executed by the presence server 5 is actually executed by execution of any program by the CPU 54.

The program 58 for executing protocol processing contains program (SIP protocol control) having function for transmitting or receiving signal between the SIP server 1 and the presence server 5 and program (HTTP protocol control) having function for transmitting or receiving signal between the application server 2 and the presence server 5. In FIG. 4, HTTP and SIP are shown as communication protocol. However, when the present invention is implemented, communication protocol except HTTP may be utilized so that the presence server 5 and the application server 2 communicate with each other.

The program 59 for executing presence server processing contains program for performing SIP User Agent processing and program for performing presence control processing. Furthermore, correspondence information of session identifier on the side of Parlay X and identifier of presence session may be provided in addition to the program for performing presence control processing.

Figure 8:
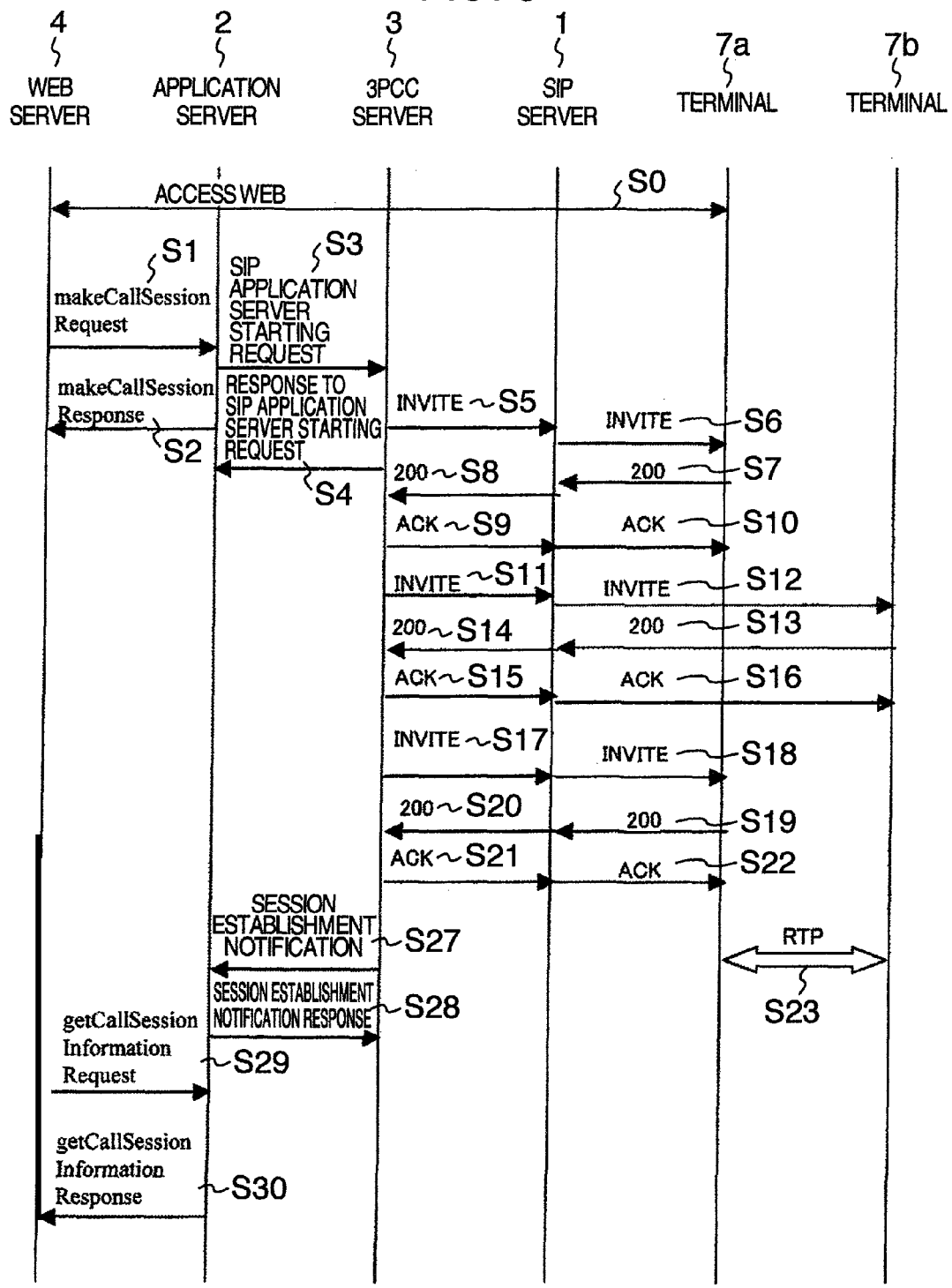
FIG. 8 is a sequence chart showing procedure of 3PCC service in the first embodiment of the present invention.
Figure 9:
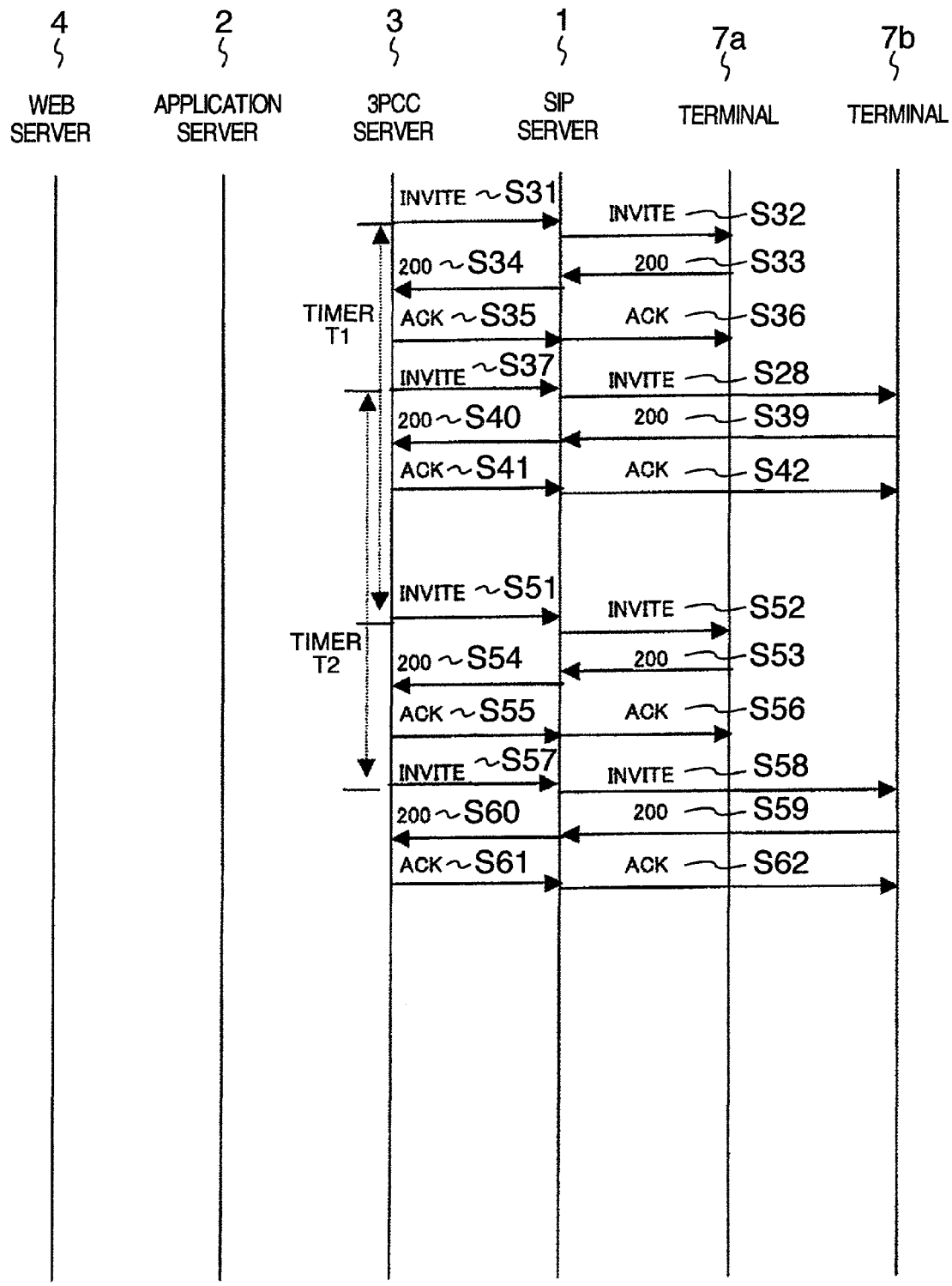
FIG. 9 is a sequence chart showing procedure of 3PCC service in the first embodiment of the present invention.
Figure 10:
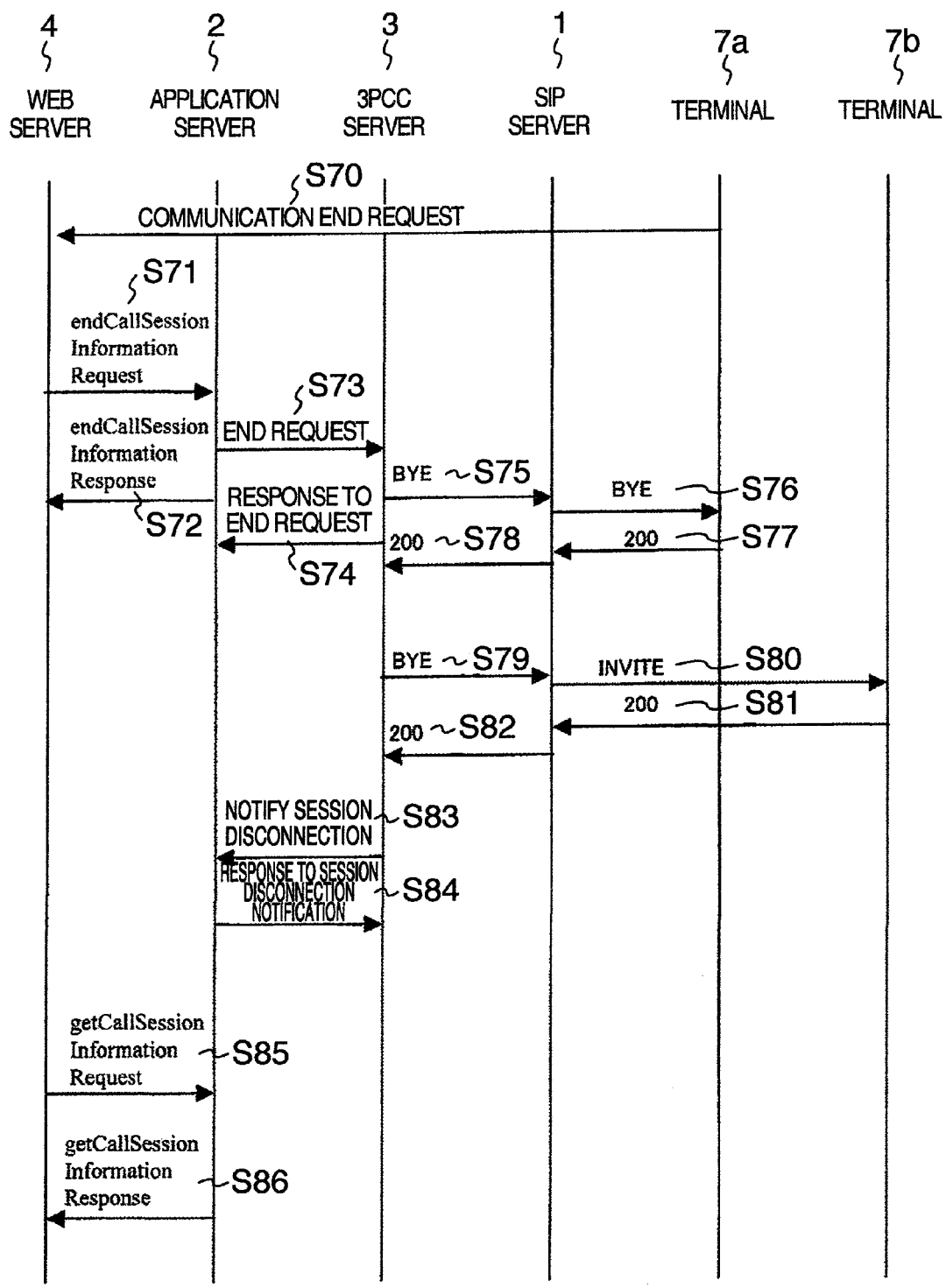
FIG. 10 is a sequence chart showing procedure of 3PCC service in the first embodiment of the present invention.

Referring now to FIGS. 8, 9 and 10, sequential operation for starting 3PCC service by terminal (7a) residing in the access network N2a shown in FIG. 1 is described.

The sequential operation in case where the user using the terminal 7a in the first embodiment accesses to the Web server 4 (S0) and requests to start 3PCC service between the terminals 7a and 7b is described.

The Web server 4 receives a request for starting 3PCC service from the terminal 7a. The Web server 4 transmits a message (makeCallSessionRequest) for making a request for establishment of session between the terminals 7a and 7b to the application server 2 (S1). The message for making the request for establishment of session contains identifiers of terminals 7a and 7b at least.

When the application server 2 receives the session establishment request, the application server 2 transmits a response message to the Web server 4 (S2).

The response message (makeCallSessionResponse) contains a call session identifier in order to identify session between the Web server 4 and the application server 2. The application server 2 produces the call session identifier.

The application server 2 searches the session information table 210 using the call session identifier as a search key. When there is no entry, the application server 2 selects a new entry 210-1 and registers address of Web server 4 in Web server address 212 of this entry.

Then, the application server 2 starts the service judgment routine 260. When the application server 2 receives the session establishment request message S1 (261), the application server 2 searches the trigger rule 220 using namespace contained in the received message as a search key (262). When there is relevant entry (for example, entry 220-n), the application server 2 reads out trigger rule and enabler IP address of the relevant entry and sets them in the enabler IP address 213 and trigger rule 214 of the relevant entry 210-1 of the session information table 210 (263). Furthermore, when "present" is set as the information 224 as to whether additional information processing is present or not in the relevant entry of the trigger rule 220, the application server performs additional processing according to namespace (271). Additional processing contains addition and deletion of expansion parameter and collection of communication log by way of example. By performing additional processing by the application server 2, processing peculiar to service and processing peculiar to the communication entrepreneur can be realized. When "not present" is set as the information 224 as to whether additional information processing is present or not in the relevant entry of the trigger rule 220, the additional processing is not performed in this step (264).

Returning now to FIG. 7, description of the service control routine 260 is continued. The application server 2 refers to the message rule 230 decided in step 263. The message rule 230 is provided for each trigger rule and is identified by a value in entry 222 of the trigger table 220. The message rule 230 stores therein at least correspondence information of the SIP message 232 corresponding to Parlay X message 231 and the information 233 as to whether parameter conversion is present or not. The application server 2 performs message conversion processing in accordance with the message rule (266). Furthermore, when "present" is set as the information 233 as to whether parameter conversion is present or not, the application server 2 searches the parameter rule 240 using parameter contained in the received message as a search key (267). When there are a plurality of parameters, all parameters are confirmed as to whether relevant entry is present or not. When the relevant entry exists, the parameter contained in the message is converted in accordance with the entry (268).

When conversion of message and parameter is completed, the application server 2 refers to the session information table 210 and reads out enabler IP address (e.g. 3pcc-ip) from the entry produced upon reception in step S1. Here, the application server 2 may set the state of "service being started" in the session state 215 of the entry 210-1.

Then, the application server 2 transmits message and parameter-converted message (SIP application server starting request) to the enabler IP address which is an address of the 3PCC server 3 (269, S3). The SIP application server starting request contains Parlay X call session identifier.

When the application server 2 receives response message from the enabler (3PCC server 3) (S4), this routine is ended (272).

In steps 262 and 265, when there is no entry, error processing is performed and this routine is ended (273). In step 270, when the application server 2 cannot receive response within a fixed time, the error processing is performed and this routine is ended (273).

That is, in FIG. 8, the application server 2 which has received the request in S1 refers to the message rule 230 and converts Parlay X message "makeCallSessionRequest" into SIP message "INVITE". Furthermore, the application server 2 refers to the parameter rule 240 and converts parameter contained in the makeCallSessionRequest into parameter contained in SIP INVITE (for example, converts parameter "callParticipant" for setting identifiers of terminals 7a and 7b into Request URI). The application server 2 utilizes the conversion engine 27 upon conversion of message and parameter. The application server 2 transmits SIP application server starting request containing converted message to the 3PCC server 3.

Returning now to FIG. 8, description of the sequential operation is continued. When the 3PCC server 3 receives the SIP application server starting request (S3), the 3PCC server 3 starts 3PCC control and performs 3PCC control of SIP base, for example. The 3PCC server 3 produces 3PCC identifier for identifying communication between terminals 7a and 7b. The 3PCC server 3 holds the 3PCC identifier while session is established.

As described in FIG. 3, 3PCC control is a program stored in memory 35 and executed by CPU 34.

3PCC service is provided by 3PCC control, SIP User Agent control and SIP protocol control. 3PCC server requests terminal 7a to establish session (S5-S10). For example, INVITE is utilized as SIP message for requesting to establish session. When terminal 7a receives the session establishment request (200), the terminal 7a responds to the request with OK. The 3PCC server 3 transmits response acknowledge ACK to the terminal 7a.

Next, the 3PCC server 3 requests terminal 7b to establish session (S11-S16). Further, the 3PCC server 3 requests the terminal 7a to update media information between the terminals 7a and 7b (S17-S22). According to the above processing, communication between terminals 7a and 7b can be made (S23).

The 3PCC server 3 transmits acknowledge signal (ACK) to session establishment response in step S21 and then notifies the session to the application server 2 with "session establishment notification" signal (S27). The "session establishment notification" (S27) contains Parlay X call session identifier received in step S3. The application server 2 searches for Parlay X call session identifier contained in the notification of step S27 and changes session state 215 in relevant entry 210-1 of the session information table 210 to "session being established".

When the application server 2 receives the signal, the application server 2 transmits the "session establishment notification response" (S28) to the reception acknowledge signal of S27 to the 3PCC server 3.

The Web server 4 transmits a state inquiry request (getCallSessionInformationRequest) to the application server 2 in order to confirm the state of the 3PCC service (S29). The transmission timing of the request depends on a set value on the side of Web server.

The application server 2 searches the session information table 210 using call session identifier contained in the request as a search key. The application server 2 reads out the session state 215 from the relevant entry 210-1 and transmits response message (getCallSessionInformationResponse) containing the session state to the Web server 4 (S30).

Here, in order to confirm that communication between terminals 7a and 7b is made normally while terminals 7a and 7b communicate with each other, the 3PCC server may transmit message to terminals 7 (7a, 7b) periodically. SIP INVITE message, for example, is utilized as the message transmitted periodically. FIG. 9 shows sequential operation in case where the 3PCC server 3 transmits the SIP INVITE message to terminals 7 periodically. The 3PCC server 3 transmits INVITE message to terminal 7a via SIP server 1 (S31, S32). When the terminal 7a receives the message, the terminal 7a transmits response message 200 (S33, S34). The 3PCC server 3 transmits acknowledge message (S35, S36) to the response message. This sequential operation is repeatedly performed between 3PCC server 3 and terminal 7a periodically (for example, timer T1) (S51-S56). Thus, it is confirmed that the communication is made normally. Timer value T1 is decided using SIP message upon session establishment.

The same messages are transmitted and received between the 3PCC server 3 and the terminal 7b (S37-S41, S57-S62). Timer value T2 is decided using SIP message upon message establishment.

In the embodiment, SIP is used as communication protocol for establishment of session. When the present invention is implemented, communication protocol except SIP may be utilized to make communication between the 3PCC server 3 and the terminals 7.

Referring now to FIG. 10, processing at the time of end of communication is described. The case where the terminal 7a transmits a communication end request to the Web server 4 is described. The communication end request is started or issued by selecting a communication end button on Web display screen provided by the Web server 4 by the user utilizing the terminal 7, for example (S70).

The Web server 4 transmits 3PCC communication end request "endCallSessionInformationRequest" to the application server 2 (S71). The message contains Parlay X call session identifier.

Here, the application server 2 searches the session information table 210 using Parlay X call session identifier as a search key. The enabler IP address 213 and the trigger rule are read out from the entry 210-1 and the session state 215 is updated to "being disconnected".

Next, when the application server 2 receives the message, the application server 2 starts the service judgment routine 260. The application server 2 refers to the trigger rule 220 using "namespace" contained in the message as a search key. When relevant entry exists, the application server 2 refers to the information 224 as to whether additional information processing is present or not of the entry. When "present" is set in the entry, the application server 2 performs additional processing in accordance with namespace.

Moreover, the application server 2 refers to the message rule table 230 corresponding to trigger rule. The application server 2 searches the trigger rule table 230 using Parlay X message received in step S71 as a search key. Here, relevant SIP message name 232 (BYE) and information 233 as to whether parameter conversion is present or not (not present) are read out from the relevant entry 230-2. Next, the application server 2 utilizes the conversion engine 27 to convert message and parameter. Then, the application server 2 transmits an end request message after conversion of message to a destination "3pcc-ip" set in the enabler IP address 213 (S73).

When the 3PCC server 3 receives the request, the 3PCC server 3 transmits response message "end request response" to the application server 2. Further, the 3PCC server 3 transmits session end message (BYE) of SIP to terminals 7a and 7b (S75 to S82).

When the 3PCC server 3 ends session between terminals 7 and 3PCC server, the 3PCC server 3 notifies session disconnection to the application server 2 (session disconnection notification message S83). The message contains Parlay X call session identifier. When the application server 2 receives the message, the application server 2 searches the session information table 210 using Parlay X call session identifier as a search key. The application server 2 searches for the entry and changes the session state 215 to "disconnection end". Next, the application server 2 transmits response message (S84) to the message (S83) to the 3PCC server 3.

Then, the application server 2 holds the relevant entry 210 of session information entry for a fixed period (after the fixed period, the entry is deleted).

When the application server 2 receives information inquiry "getCallSessionInformationRequest" (S85) from the Web server 4 while the application server 2 holds the entry, the application server 2 searches the session information table 210 using call session identifier contained in the message as a search key. The application server 2 reads out value of session information of the entry and transmits response message "getCallSessionInformationResponse" (S86) containing session state "disconnection end" to the Web server 4.

When the application server 2 receives "getCallSessionInformationRequest" (S85) after the lapse of fixed time (after the entry of session information table is deleted), there is no entry in session information table. In this case, the application server 2 transmits response message "getCallSessionInformationResponse" (S86) containing session state "no relevant item" to the Web server 4. The transmission timing of the request (S85) depends on set value on the side of Web server 4.

In the embodiment, the 3PCC server 3 is utilized as enabler by way of example. When the present invention is implemented, SIP application server except the 3PCC server may be utilized as enabler. There is the presence server 5, for example, as enabler except the 3PCC server.

In the first embodiment, the application server 2, the 3PCC server 3 and the presence server 5 may be realized in an apparatus having the same housing like blade server.

According to the first embodiment of the present invention, the application server 2 includes trigger rule and parallel rule and conversion of message and parameter can be performed between different messages (for example, Parlay X message and SIP message). Moreover, the trigger rule table is used to make judgment as to whether additional information processing is present or not, so that the application server 2 can perform additional information processing such as expansion of original parameter and high-speed processing of message. Consequently, the communication entrepreneur and the service provider can provide services flexibly.

Next, a second embodiment of the present invention is described with reference to the drawings.

In the first embodiment, the application server 2 provides the message rule and the parameter rule. In contrast, in the second embodiment, the presence server 5 and the 3PCC server 3 include the message rule and the parameter rule. By providing the message rule and the parameter rule in the presence server 5 and the 3PCC server 3, the application server 2 can concentrate on service function distribution processing and high-speed processing of additional function.

The communication network of the second embodiment of the present invention is the same as that of the first embodiment and accordingly description thereof is omitted (refer to FIG. 1). Hereinafter, only different points of the second embodiment of the present invention from the first embodiment are described.

Figure 11:
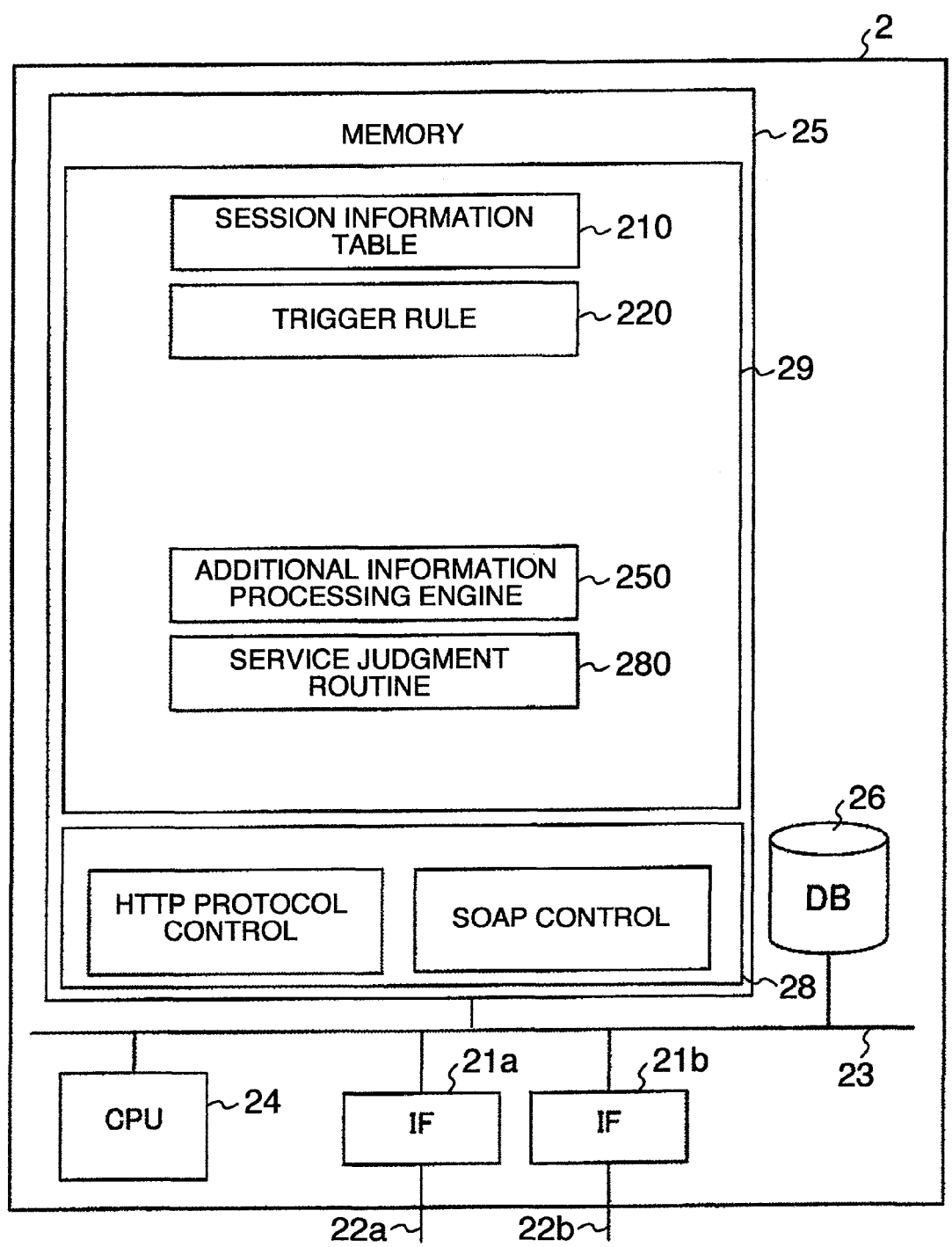
FIG. 11 is a schematic diagram illustrating an example of configuration of an application server 2 in a second embodiment of the present invention.

FIG. 11 is a schematic diagram illustrating a configuration example of the application server 2 in the second embodiment of the present invention.

In the second embodiment, the memory 25 does not include message rule, parameter rule and conversion engine. These functions are provided in the presence server 5 and the 3PCC server 3. The application server 2 includes a service judgment routine 280 instead of the service judgment routine 260.

In the embodiment, the application server 2 can concentrate on service function distribution processing and the high-speed processing of additional function.

Figure 12:
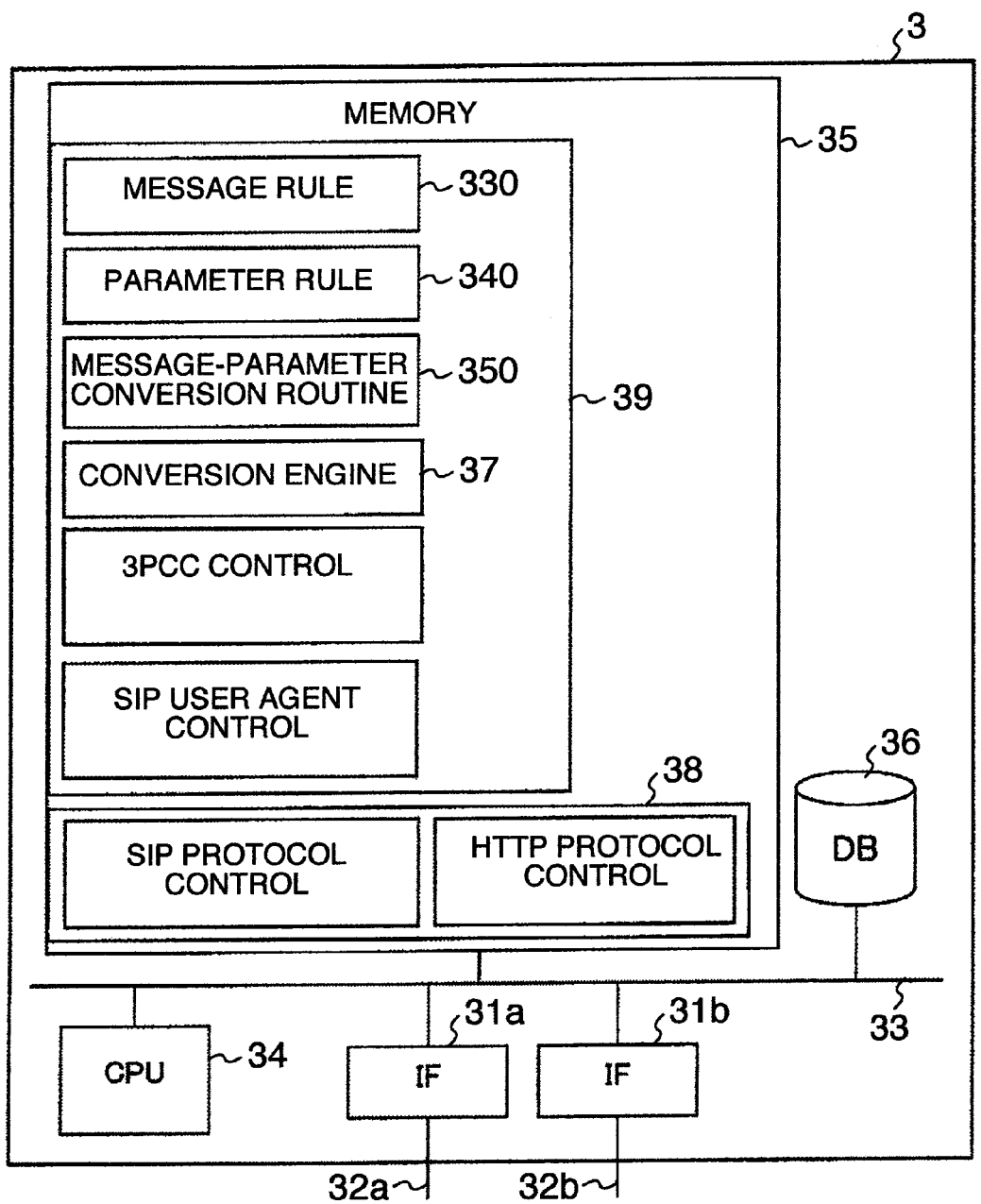
FIG. 12 is a schematic diagram illustrating an example of configuration of a 3PCC server 3 in the second embodiment of the present invention.

FIG. 12 is a schematic diagram illustrating a configuration example of the 3PCC server 3 in the second embodiment of the present invention. In the second embodiment, the memory 35 of the 3PCC server 3 includes message rule 330, parameter rule 340, message-parameter conversion routine 350 and conversion engine 37 in addition to the elements of the first embodiment.

By providing message rule, parameter rule and conversion engine in the 3PCC server 3, the application server 2 can concentrate on service function distribution processing and high-speed processing of additional function. In the embodiment, the system operator can add function peculiar to 3PCC service such as parameter expansion for 3PCC service without influencing the application server 2.

Figure 13:
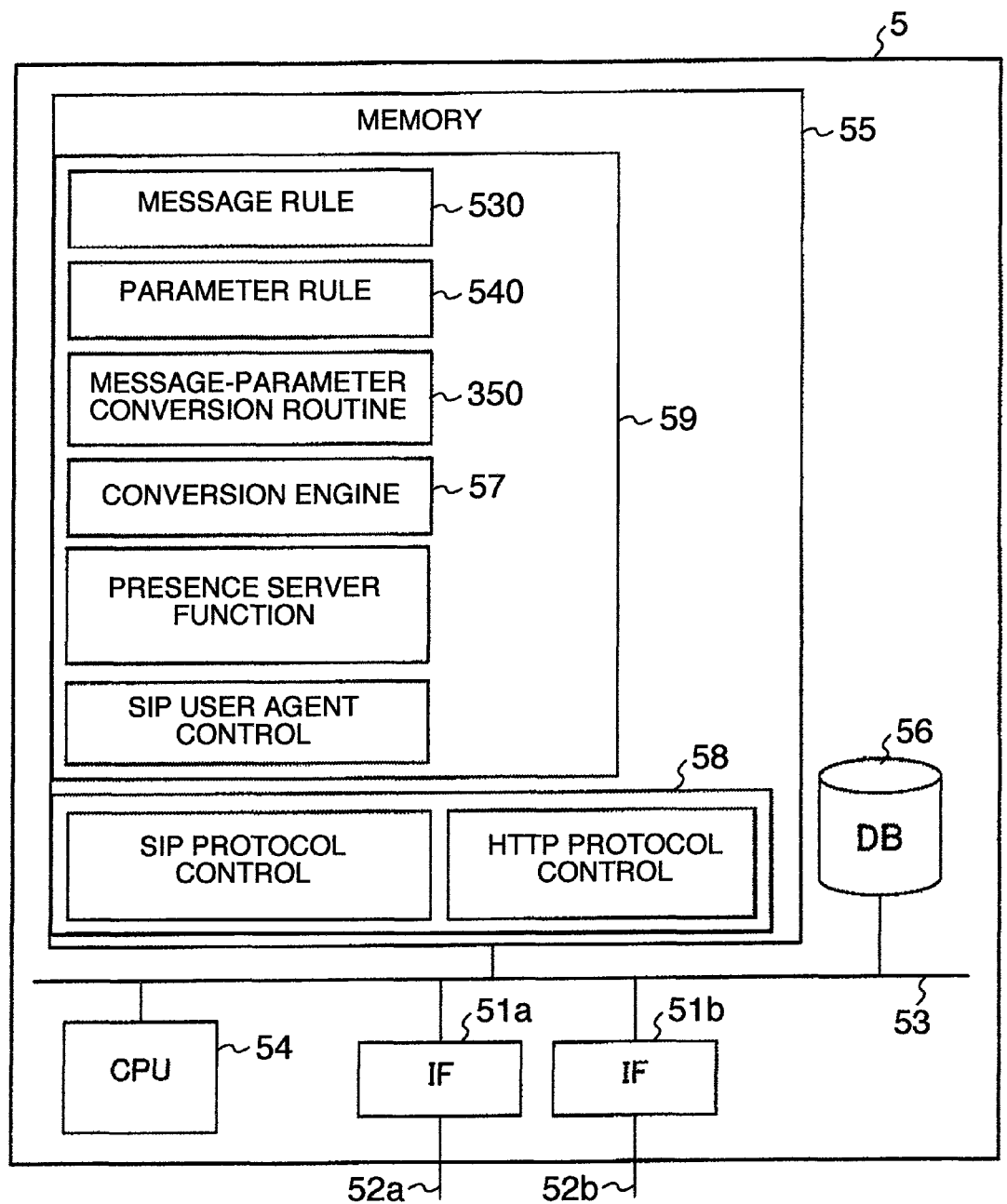
FIG. 13 is a schematic diagram illustrating an example of configuration of a presence server 5 in the second embodiment of the present invention.

FIG. 13 is a schematic diagram illustrating a configuration example of the presence server 5 in the second embodiment of the present invention. In the second embodiment, memory 55 of the presence server 5 includes message rule 530, parameter rule 540, message-parameter conversion routine 350 and conversion engine 57 in addition to the elements of the first embodiment.

By providing the message rule, the parameter rule and the conversion engine in the presence server 5, the application server 2 can concentrate on service function distribution processing and high-speed processing of additional function. In the embodiment, the system operator can add function peculiar to presence service such as parameter expansion for presence service without influencing the application server 2.

Figure 14:
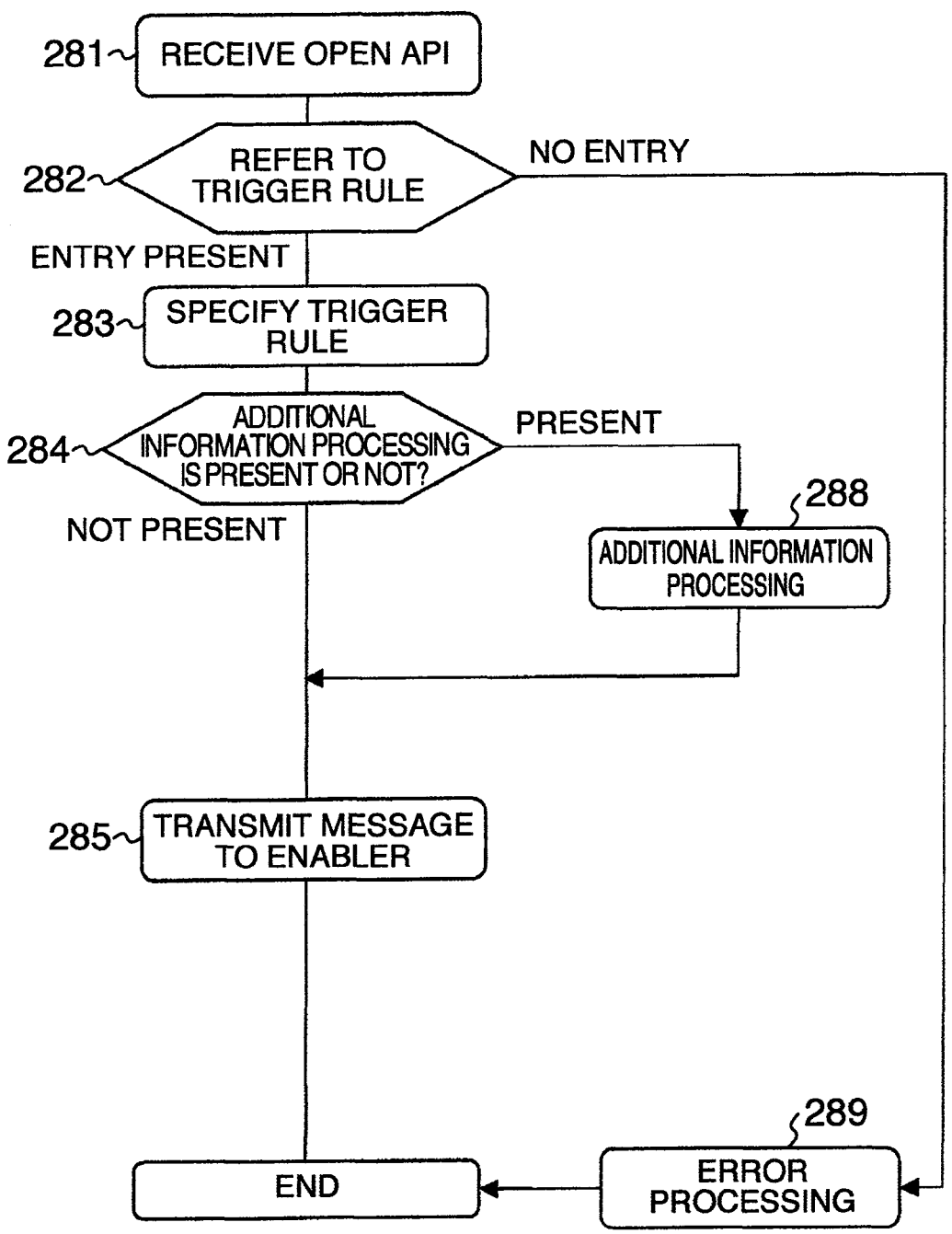
FIG. 14 is a flow chart showing service judgment routine of the application server 2 in the second embodiment of the present invention.

FIG. 14 is a diagram showing the service judgment routine 280 in the second embodiment of the present invention. The service judgment routine 280 in the second embodiment does not contain message conversion step and parameter conversion step in the first embodiment.

Figure 15:
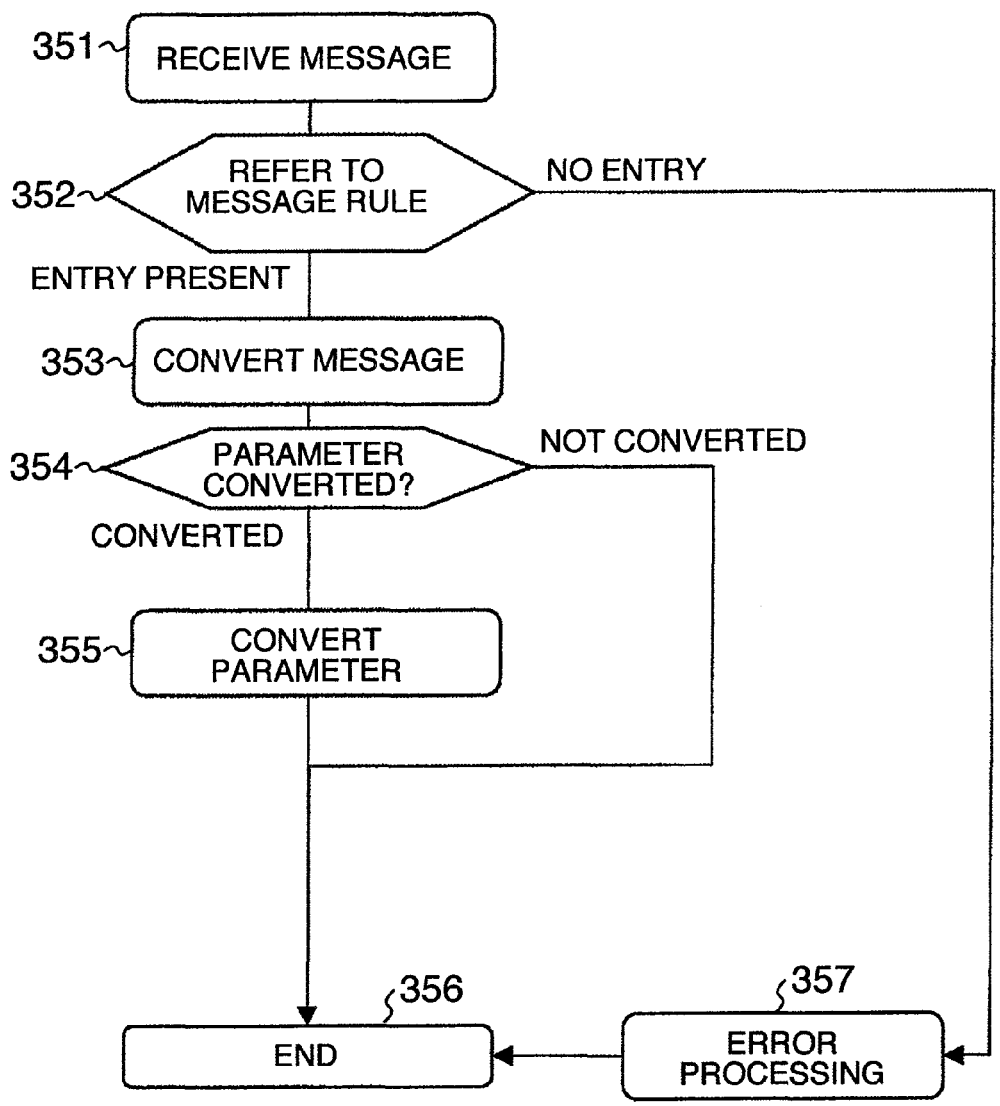
FIG. 15 is a flow chart showing message-parameter conversion routine in the second embodiment of the present invention.

FIG. 15 is a diagram showing the message-parameter conversion routine 350 in the second embodiment of the present invention. Enabler (for example, 3PCC server 3, presence server 5) includes the message-parameter conversion routine 350.

In the second embodiment, sequential operation for starting 3PCC service by terminal (7*a*) residing in the access network N2*a* shown in FIG. 1 is described. Since the sequential diagram is the same as that of the first embodiment, only different part of the sequential operation of the second embodiment from that of the first embodiment is described with reference to FIGS. 8, 9 and 10.

Operation in steps S1 and S2 is the same as the first embodiment.

Then, the application server 2 starts the service judgment routine 280. When the application server 2 receives session establishment request message (S1) (281), the application server 2 searches trigger rule 220 using namespace contained in received message as a search key (282). When there is relevant entry (for example, entry 220-1), trigger rule and enabler IP address of the entry are read out and set to enabler IP address 213 and trigger rule 214 of the entry 210-1 of the session information table 210 (283). Furthermore, when information 224 as to whether additional information processing is present or not of the relevant entry of the trigger rule 220 is set to "present", the application server 2 performs additional processing in accordance with namespace (288). Addition processing contains addition and deletion of expansion parameter and collection of communication log by way of example. By performing additional processing by the application server 2, function peculiar to service and function peculiar to the communication entrepreneur can be realized.

When the information 224 as to whether additional information processing is present or not of the relevant entry of the trigger rule 220 is set to "not present", the additional processing in this step is not performed (284). In step 282, when there is no relevant entry, error processing is performed (289) and this routine is ended.

Then, the application server 2 reads out enabler IP address (for example, 3pcc-ip) from entry 210-1 of the session information table 210 produced upon reception in step S1. Here, the application server 2 may set the state "service being started" in the session state 215 of the entry 210-1.

The application server 2 transmits SIP application server starting request (S3) to the enabler IP address (3PCC server 3) (285). The SIP application server starting request contains Parlay X call session identifier.

When the 3PCC server 3 receives the SIP application server starting request (S3), the 3PCC server 3 starts the message-parameter conversion routine 350 (351).

The 3PCC server 3 refers to the message rule 330 in the memory 35. The message rule 330 stores therein correspondence information of Parlay X message 331, SIP message 332 and information 333 as to whether parameter conversion is present or not at least. The 3PCC server 3 performs conversion processing of message in accordance with the message rule (353). When message is converted, the 3PCC server 3 may utilize the conversion engine 37.

When "present" is set in the information 333 as to whether parameter conversion is present or not, the 3PCC server 3 searches the parameter rule 340 using parameter contained in the received message as a search key (354). When there are plural parameters, whether relevant entry exists or not is confirmed for all parameters. When relevant entry exists, the parameter contained in the message is converted in accordance with parameter conversion table (355).

When conversion of message and parameter is ended, the 3PCC server 3 ends this routine (365). In step 352, when there is not relevant message rule, error processing is performed and this routine is ended (357).

Then, the 3PCC server 3 starts 3PCC control to perform 3PCC control of SIP base, for example. The following processing from steps S5 to S62 is the same as in the first embodiment.

Referring now to FIG. 10, only different part of the processing upon end of communication from the first embodiment is described.

When the application server 2 receives "endCallSessionInformationRequest" (S71), the application server starts the service judgment routine 280. The application server 2 refers to the trigger rule 220 using "namespace" contained in the message as a search key. When there is relevant entry, the application server 2 refers to the information 224 as to whether additional information processing is present or not of the entry. When "present" is set in the entry, the application server 2 performs additional information processing in accordance with the namespace. Then, the application server 2 reads out enabler IP address 213 from the relevant entry of the session information table and transmits end request message to destination "3pcc-ip" set thereto (S73, 285).

When the 3PCC server 3 receives the end request message (S73), the 3PCC server 3 starts message-parameter conversion routine 350.

First, the 3PCC server 3 refers to the message rule table 330 using Parlay X message received in step S71 as a search key. The 3PCC server 3 reads out SIP message 332 (BYE) and information 333 as to whether parameter conversion is present or not (not present) from relevant entry 330-2. When it is not necessary to change parameter, this routine is ended. Next, the 3PCC server 3 utilizes the conversion engine 37 to convert message. Then, the 3PCC server 3 transmits session end message (BYE) of SIP to terminals 7a and 7b (S75 to S82). The following processing is the same as that of the first embodiment. FIG. 16A shows an example of configuration of message rule in 3PCC server 3 of the embodiment and FIG. 16B shows an example of configuration of parameter rule in 3PCC server 3.

In the embodiment, the 3PCC server 3 is utilized as the enabler by way of example. When the present invention is implemented, SIP application server except 3PCC server may be utilized as enabler. There is the presence server 5, for example, as the enabler except 3PCC server. In this case, tables referred to at the time that the presence server 5 starts message-parameter conversion routine 350 are message rule 530 and parameter rule 540.

According to the second embodiment of the present invention, the application server 2 includes the trigger rule and the presence server 5 and the 3PCC server 3 provide the message rule and the parameter rule. Thus, the application server 2 can concentrate on service function distribution processing and high-speed processing of additional function. Processing (for example, addition of special parameter) peculiar to SIP application server can be realized only by 3PCC server 3 or presence server 5. Thus, the communication entrepreneur and the service provider can perform addition and expansion of service. That is, service can be provided rapidly and customized.

Further, in the second embodiment, the application server 2, the 3PCC server 3 and the presence server 5 may be realized in the apparatus having the same housing like blade server.

The foregoing description has been made to the embodiments, although the present invention is not limited thereto and it is apparent to those skilled in the art that various changes and modifications can be made without departing from the sprit and the scope of claims of the invention.

According to the present invention, the communication entrepreneur and the service provider can provide service flexibly. Concretely, the application server 2 includes the trigger rule and the parameter rule and conversion of message and parameter can be made between different messages (for example, Parlay X message and SIP message). Furthermore, the trigger table is used to judge whether additional information processing is present or not, so that the application server can perform additional information processing such as expansion of original parameter and high-speed processing of message.

DESCRIPTION OF REFERENCE NUMERALS 2 application server
3 3PCC server
5 presence server
220 trigger rule
230 message rule
240 parameter rule
260 service judgment routine

The invention claimed is:
1. A communication system comprising:
an application server;
a Web server coupled to the application server; and
a plurality of service control servers coupled to the application server;
the Web server receives a request from a terminal for requesting one of the communication services included in a plurality of service functions embodied by the plurality of service control servers; and
transmits a first message to the application server based on the request, the first message being in conformity with Parlay X API and including an identifier of a first procedure;

the application server receives the first message from the Web server;

extracts the identifier of the first procedure from the received first message; manages a relation between the identifier of the first procedure, a rule, and an IP address of a first service control server of the plurality of service control servers, based upon a rule information;

specifies the IP address of the first service control server and the rule, which correspond to the extracted identifier by using the rule information;

stores the received first message with a corresponding second message of a second procedure, based upon a message rule information provided for the rule;

converts the received first message into the corresponding second message based on the message rule information; and sends the corresponding second message to the first service control server including the specified IP address;

the first service control server receives the corresponding second message from the application server; and provides the requested service function based on the corresponding second message.

2. A communication system according to claim 1, wherein when the application server receives the first message in conformity with Parlay X API, Namespace information is extracted included from the first message and a corresponding service control server is specified from the Namespace information.

3. A communication system according to claim 1, the application server further detecting whether setting of additional information processing corresponding to the first message is present or not and performing the additional information processing when the additional information processing is set.

4. A communication system according to claim 1, the first message being in conformity with a web service API.

5. An application server coupled to a Web server and a plurality of service control servers, the application server being operatively configured to receive a first message from the Web server, the first message being in conformity with Parlay X API and including an identifier of a first procedure;

extract the identifier of the first procedure from the received first message;

manage a relation between the identifier of the first procedure, a rule, and an IP address of a first service control server of the plurality of service control servers, based upon a rule information;

specify the IP address of the first service control server and the rule, which correspond to the extracted identifier by using the rule information;

store the received first message with a corresponding second message of a second procedure, based upon a message rule information provided for the rule;

convert the received first message into the corresponding second message based on the message rule information; and send the corresponding second message to the service control server including the specified IP address.

6. An application server according to claim 5, wherein when the message in conformity with Parlay X API is received, Namespace information included in the first message is extracted and a corresponding service control server having service function is specified in accordance with the Namespace information.

7. An application server according to claim 5, the application server being operatively configured to convert the first message into a session control signal.

8. An application server according to claim 7, the session control signal being SIP.

9. An application server according to claim 5, the application server being operatively configured to detect whether additional information processing corresponding the first message is present or not and to perform a program corresponding to the additional information processing when the additional information processing is detected.

10. A communication method in a communication system including an application server, a Web server coupled to the application server, and a plurality of service control servers coupled to the application server, the method comprising:

receiving, by the Web server, a request from a terminal for requesting one of the communication services included in a plurality of service functions provided by the plurality of service control servers;

transmitting, by the Web server, a first message to the application server based on the request, the first message being in conformity with Parlay X API and including an identifier of a first procedure;

receiving, by the application server, the first message from the Web server; extracting, by the application server, the identifier of the first procedure from the received first message;

managing, by the application server, a relation between the identifier of the first procedure, a rule, and an IP address of a first service control server of the plurality of service control servers, based upon a rule information;

specifying, by the application server, the IP address of the first service control server and the rule, which correspond to the extracted identifier by using the rule information;

storing, by the application server, the received first message with a corresponding second message of a second procedure, based upon a message rule information provided for the rule; converting, by the application server, the received first message into the corresponding second message based on the message rule information;

sending, by the application server, the corresponding second message to the first service control server including the specified IP address; receiving, by the first service control server, the corresponding second message from the application server; and providing, by the first service control server, the requested service function based on the corresponding second message.

11. A communication method according to claim 10, the application server converting the first message into session control signal.

* * * * *

UNITED STATES PATENT AND TRADEMARK OFFICE
CERTIFICATE OF CORRECTION

PATENT NO. : 8,656,001 B2  
APPLICATION NO. : 12/866396  
DATED : February 18, 2014  
INVENTOR(S) : Yukiko Takeda et al.

Page 1 of 1

It is certified that error appears in the above-identified patent and that said Letters Patent is hereby corrected as shown below:

In the Claims

In claim 2, column 15, lines 23-28 should read:

--Claim 2. A communication system according to Claim 1, wherein when the application server receives the first message in conformity with Parlay X API, Namespace information is extracted from the first message and a corresponding service control server is specified from the Namespace information.--

Signed and Sealed this  
First Day of July, 2014

Michelle K. Lee  
*Deputy Director of the United States Patent and Trademark Office*